(12) United States Patent
Wakeling et al.

(10) Patent No.: US 11,341,155 B2
(45) Date of Patent: May 24, 2022

(54) MAPPING INSTANCES OF A DATASET WITHIN A DATA MANAGEMENT SYSTEM

(71) Applicant: Ab Initio Technology LLC, Lexington, MA (US)

(72) Inventors: Tim Wakeling, Andover, MA (US); Adam Weiss, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 16/902,949

(22) Filed: Jun. 16, 2020

(65) Prior Publication Data

US 2020/0311098 A1 Oct. 1, 2020

Related U.S. Application Data

(63) Continuation of application No. 12/628,521, filed on Dec. 1, 2009, now abandoned.
(Continued)

(51) Int. Cl.
*G06F 16/25* (2019.01)
*G06F 16/28* (2019.01)
(Continued)

(52) U.S. Cl.
CPC ........ *G06F 16/258* (2019.01); *G06F 16/2365* (2019.01); *G06F 16/24578* (2019.01);
(Continued)

(58) Field of Classification Search
CPC ............. G06F 16/258; G06F 16/24578; G06F 16/283; G06F 40/197; G06F 16/84;
(Continued)

(56) References Cited

U.S. PATENT DOCUMENTS

| 5,630,127 A | 5/1997 | Moore |
| 5,758,351 A | 5/1998 | Gibson et al. |

(Continued)

FOREIGN PATENT DOCUMENTS

| CN | 102081762 | 6/2011 |
| CN | 103218229 | 7/2013 |

(Continued)

OTHER PUBLICATIONS

Sibley et al. "A Data Definition and Mapping Language" University of Michigan and Robert W. Taylor University of Massachusetts ACM No. 12, vol. 16, Dec. 1973 (Year: 1973).*

(Continued)

*Primary Examiner* — Tamara T Kyle
*Assistant Examiner* — Berhanu Mitiku
(74) *Attorney, Agent, or Firm* — Fish & Richardson P.C.

(57) ABSTRACT

Mapping data stored in a data storage system for use by a computer system includes processing specifications of dataflow graphs that include nodes representing computations interconnected by links representing flows of data. At least one of the dataflow graphs receives a flow of data from at least one input dataset and at least one of the dataflow graphs provides a flow of data to at least one output dataset. A mapper identifies one or more sets of datasets. Each dataset in a given set matches one or more criteria for identifying different versions of a single dataset. A user interface is provided to receive a mapping between at least two datasets in a given set. The mapping received over the user interface is stored in association with a dataflow graph that provides data to or receives data from the datasets of the mapping.

70 Claims, 8 Drawing Sheets

Related U.S. Application Data

(60) Provisional application No. 61/119,164, filed on Dec. 2, 2008.

(51) Int. Cl.
 *G06F 16/2457* (2019.01)
 *G06F 16/23* (2019.01)
 *G06F 16/84* (2019.01)
 *G06F 16/27* (2019.01)
 *G06F 40/197* (2020.01)

(52) U.S. Cl.
 CPC .............. *G06F 16/25* (2019.01); *G06F 16/27* (2019.01); *G06F 16/283* (2019.01); *G06F 16/84* (2019.01); *G06F 40/197* (2020.01)

(58) Field of Classification Search
 CPC ................. G06F 16/86; G06F 16/2329; G06F 16/24544; G06F 16/2365; G06F 16/25; G06F 16/27
 See application file for complete search history.

(56) References Cited

U.S. PATENT DOCUMENTS

| | | |
|---|---|---|
| 5,966,072 A | 10/1999 | Stanfill et al. |
| 6,088,702 A | 7/2000 | Plantz |
| 6,494,159 B2 | 12/2002 | Sirmalis et al. |
| 6,708,186 B1 | 3/2004 | Claborn et al. |
| 6,948,154 B1 | 9/2005 | Rothermel et al. |
| 7,080,088 B1 | 7/2006 | Lau |
| 7,110,924 B2 | 9/2006 | Prewett et al. |
| 7,164,422 B1 | 1/2007 | Wholey, III et al. |
| 7,167,850 B2 | 1/2007 | Stanfill |
| 7,661,067 B2 | 2/2010 | Chen et al. |
| 7,689,565 B1 | 3/2010 | Gandhi |
| 7,716,630 B2 | 5/2010 | Wholey et al. |
| 7,765,529 B1 | 7/2010 | Singh et al. |
| 7,840,949 B2 | 11/2010 | Schumacher et al. |
| 7,853,553 B2 | 12/2010 | Lankinen et al. |
| 7,890,509 B1 | 2/2011 | Pearcy et al. |
| 7,895,586 B2 | 2/2011 | Ozone |
| 7,979,646 B2 | 7/2011 | Furtek et al. |
| 8,069,129 B2 | 11/2011 | Gould et al. |
| 8,423,564 B1 | 4/2013 | Hayes et al. |
| 8,484,159 B2 | 7/2013 | Stanfill et al. |
| 8,516,008 B1 | 8/2013 | Marquardt |
| 2001/0007959 A1 | 7/2001 | Abdalla |
| 2001/0014890 A1 | 8/2001 | Liu et al. |
| 2002/0161799 A1 | 10/2002 | Maguire et al. |
| 2002/0194196 A1 | 12/2002 | Weinberg |
| 2002/0194314 A1 | 12/2002 | Kouznetsov |
| 2003/0016246 A1 | 1/2003 | Singh |
| 2003/0041063 A1 | 2/2003 | Brady |
| 2003/0154191 A1 | 8/2003 | Fish |
| 2003/0163441 A1 | 8/2003 | Godfredsen |
| 2003/0163597 A1 | 8/2003 | Hellman et al. |
| 2004/0015783 A1 | 1/2004 | Lennon et al. |
| 2004/0024740 A1 | 2/2004 | McGeorge |
| 2004/0056908 A1 | 3/2004 | Bjornson et al. |
| 2004/0088318 A1 | 5/2004 | Brady |
| 2004/0225632 A1 | 11/2004 | Benson et al. |
| 2004/0225682 A1 | 11/2004 | Murman |
| 2004/0239681 A1 | 12/2004 | Robotham et al. |
| 2005/0010896 A1 | 1/2005 | Meliksetian et al. |
| 2005/0060313 A1 | 3/2005 | Naimat et al. |
| 2005/0060317 A1 | 3/2005 | Lott et al. |
| 2005/0097561 A1 | 5/2005 | Schumacher |
| 2005/0114369 A1 | 5/2005 | Gould et al. |
| 2005/0144189 A1 | 6/2005 | Edwards et al. |
| 2005/0178833 A1 | 8/2005 | Kisliakov |
| 2005/0187984 A1 | 8/2005 | Chen |
| 2005/0234762 A1 | 10/2005 | Pinto et al. |
| 2005/0262121 A1 | 11/2005 | Cesare et al. |
| 2005/0289167 A1 | 12/2005 | Haselden et al. |
| 2006/0007464 A1 | 1/2006 | Percey |
| 2006/0020570 A1 | 1/2006 | Wu |
| 2006/0095466 A1 | 5/2006 | Stevens et al. |
| 2006/0200739 A1 | 9/2006 | Bhatia et al. |
| 2006/0282480 A1 | 12/2006 | Johnson |
| 2007/0011208 A1 | 1/2007 | Smith |
| 2007/0011668 A1 | 1/2007 | Wholey et al. |
| 2007/0027858 A1 | 2/2007 | Weinberg et al. |
| 2007/0050750 A1 | 3/2007 | Bykov et al. |
| 2007/0094060 A1 | 4/2007 | Apps et al. |
| 2007/0136692 A1 | 6/2007 | Seymour et al. |
| 2007/0179956 A1 | 8/2007 | Whitmyer |
| 2007/0198457 A1 | 8/2007 | Olenick et al. |
| 2007/0220022 A1 | 9/2007 | Lankinen |
| 2007/0226203 A1 | 9/2007 | Adya et al. |
| 2007/0239751 A1 | 10/2007 | Wei et al. |
| 2007/0271381 A1 | 11/2007 | Wholey et al. |
| 2007/0276787 A1 | 11/2007 | Piedmonte |
| 2007/0294119 A1 | 12/2007 | Eicher et al. |
| 2007/0294312 A1 | 12/2007 | Seshadri et al. |
| 2008/0049022 A1 | 2/2008 | Sherb et al. |
| 2008/0083237 A1* | 4/2008 | Street .................... F25B 49/027 62/196.4 |
| 2008/0126988 A1 | 5/2008 | Mudaliar |
| 2008/0162384 A1* | 7/2008 | Kleist .................... G06N 20/00 706/12 |
| 2008/0201359 A1 | 8/2008 | Warshavsky et al. |
| 2008/0228697 A1 | 9/2008 | Adya et al. |
| 2008/0243772 A1 | 10/2008 | Fuxman et al. |
| 2008/0243891 A1 | 10/2008 | Super et al. |
| 2008/0256014 A1* | 10/2008 | Gould ...................... G06N 5/04 706/48 |
| 2008/0312979 A1 | 12/2008 | Lee et al. |
| 2008/0313204 A1 | 12/2008 | Schultz et al. |
| 2009/0036749 A1 | 2/2009 | Freiburger |
| 2009/0037488 A1 | 2/2009 | Abrams |
| 2009/0063515 A1 | 3/2009 | Bar-Or et al. |
| 2009/0083313 A1 | 3/2009 | Stanfill et al. |
| 2009/0089630 A1* | 4/2009 | Goldenberg ........ G06F 11/0769 714/704 |
| 2009/0094291 A1 | 4/2009 | Yalamanchi |
| 2009/0193046 A1 | 7/2009 | Desai |
| 2009/0234623 A1 | 9/2009 | Germain |
| 2009/0319494 A1 | 12/2009 | Gooder |
| 2009/0327196 A1 | 12/2009 | Studer et al. |
| 2010/0083237 A1* | 4/2010 | Kneebone ........... G06F 11/3624 717/128 |
| 2010/0100220 A1 | 4/2010 | Belanger et al. |
| 2010/0114833 A1 | 5/2010 | Mu |
| 2010/0121890 A1 | 5/2010 | Perkins et al. |
| 2010/0138383 A1 | 6/2010 | Winters et al. |
| 2010/0138388 A1 | 6/2010 | Wakeling et al. |
| 2010/0145914 A1 | 6/2010 | Kanno et al. |
| 2010/0198769 A1 | 8/2010 | Gould et al. |
| 2010/0223218 A1 | 9/2010 | Prendergast |
| 2011/0061057 A1 | 3/2011 | Harris et al. |
| 2011/0066602 A1 | 3/2011 | Studer et al. |
| 2011/0145297 A1 | 6/2011 | Singh |
| 2011/0276789 A1 | 11/2011 | Chambers et al. |
| 2011/0295863 A1 | 12/2011 | Weir et al. |
| 2012/0054164 A1 | 3/2012 | Falkebo et al. |
| 2012/0102029 A1 | 4/2012 | Larson et al. |
| 2012/0158625 A1 | 6/2012 | Nelke et al. |
| 2012/0167112 A1 | 6/2012 | Harris et al. |
| 2012/0185449 A1 | 7/2012 | Gould et al. |
| 2012/0310905 A1 | 12/2012 | Hans |
| 2013/0166515 A1 | 6/2013 | Kung |
| 2014/0108357 A1 | 4/2014 | Procops |

FOREIGN PATENT DOCUMENTS

| | | |
|---|---|---|
| EP | 2221733 | 8/2010 |
| JP | 05-507376 | 10/1993 |
| JP | 07-044368 | 2/1995 |
| JP | H11-143755 | 5/1999 |
| JP | 2002-279147 | 9/2002 |
| JP | 2006-277624 | 10/2006 |
| JP | 2008-524671 | 7/2008 |

(56) References Cited

FOREIGN PATENT DOCUMENTS

| | | |
|---|---|---|
| JP | 2008-547134 | 12/2008 |
| JP | 2011-113299 | 6/2011 |
| WO | WO 2010/056867 | 5/2010 |
| WO | WO 2010/065511 | 6/2010 |

OTHER PUBLICATIONS

Chaiken et al., "Xope: easy and efficient parallel processing of massive data sets," J. Proc. Of the VLDB Endowment Homepagearchive, vol. 1, No. 2, (2008), pp. 1265-1276.
Chinese Office Action issued in CN 106796585 A, dated Mar. 15, 2019 (English translation).
CN Office action in Chinese Appln. No. 201910769882.0, dated Feb. 5, 2020, 17 pages (No translation available).
Decision to grant, allowed claims, and English translations thereof in Korean Application No. 10-2011-7015313, dated Jul. 6, 2016, 14 pages.
Harkins, "Use Excel's Conditional Formatting to Find Errors" TechRepublic, pp. 1-3, Feb. 16, 2008: http://www.techrepublic.com/blog/microsoft-office/use-excels-conditional-formatting-to-find-errors/.
International Search Report & Written Opinion in International Application No. PCT/US09/66210, dated Jan. 27, 2010, 8 pages.
International Search Report & Written Opinion in International Application No. PCT/US10/49142, dated Nov. 5, 2010, 11 pages.
International Search Report & Written Opinion in International Application No. PCT/US2011/057623, dated Jan. 25, 2012, 13 pages.
International Search Report & Written Opinion in International Application No. PCT/US2012/021286, dated May 4, 2012, 15 pages.
International Search Report & Written Opinion issued in PCT application No. PCT/US2013/064979, dated Nov. 28, 2013, 11 pages.
International Search Report and Written Opinion in International Application No. PCT/US2015/049131, dated Nov. 26, 2015, 14 pages.
Japanese Office Action in Japanese Application No. 2011-539631, dated Oct. 24, 2013, 3 pages (English Translation).
Japanese Office Action issued in JP2017-511602, dated Feb. 20, 2019 (English Translation).
Liskin, "Microsoft Access 97 for Windows SuperGuide" Ziff-Davis Press, Jan. 1, 1997, Ch. 4 & 15, pp. 117-157 and 687-739.
Melia et al., "Constraint-Based Validation of Adaptive e-Lerning Courseware," IEEE Transactions on Learning Technologies, vol. 2, No. 1, Jan.-Mar. 2009, pp. 37-49.
Pinheiro et al., "Mobile agents for aggregation of network management data," Agent Systems and Applications, (1999) pp. 130-140.
Rull et al., "MVT: A Schema Mapping Validation Tool," EDBT'09, Mar. 24-26, 2009, pp. 1120-1123.
Van Megen et al., "Costs and benefits of early defect detection: experiences from developing client server and host applications," Software Quality Journal 4, pp. 247-256 (1995).
Indian Notice of Hearing in IN Appln. No. 3297/CHENP/2011, dated Oct. 8, 2020, 3 pages.

\* cited by examiner

MAPPING INSTANCES OF A DATASET WITHIN A DATA MANAGEMENT SYSTEM

CROSS-REFERENCE TO RELATED APPLICATIONS

This application is a continuation of U.S. patent application Ser. No. 12/628,521, filed on Dec. 1, 2009, which claims priority to U.S. Application Ser. No. 61/119,164, filed on Dec. 2, 2008, both incorporated herein by reference.

BACKGROUND

This description relates to mapping instances of a dataset within a data management system.

A modern data management system may include a multitude of elements representing different aspects of the system. Systems of lesser complexity often allow data to be viewed directly without additional processing for the purpose of accurate visualization. Systems of greater complexity may require additional mechanisms for the data to be meaningfully viewed. A complex data management system made up of many elements may store data in many different forms and process data in many different ways. These forms of storage and processing many relate to each other in ways that are not apparent without a way to analyze the relationships.

SUMMARY

In a general aspect, a method for mapping data stored in a data storage system for use by a computer system includes processing specifications of dataflow graphs that include nodes representing computations interconnected by links representing flows of data, with at least one of the dataflow graphs receiving a flow of data from at least one input dataset and at least one of the dataflow graphs providing a flow of data to at least one output dataset; identifying one or more sets of datasets, where each dataset in a given set matches one or more criteria for identifying different versions of a single dataset; providing a user interface to receive a mapping between at least two datasets in a given set; and storing the mapping received over the user interface in association with a dataflow graph that provides data to or receives data from the datasets of the mapping.

In another general aspect, a system for mapping data stored in a data storage system includes a data storage system storing specifications of dataflow graphs that include nodes representing computations interconnected by links representing flows of data, with at least one of the dataflow graphs receiving a flow of data from at least one input dataset and at least one of the dataflow graphs providing a flow of data to at least one output dataset; a mapper that identifies one or more sets of datasets associated with the dataflow graphs, where each dataset in a given set matches one or more criteria for identifying different versions of a single dataset; a user interface that receives a mapping between at least two datasets in a given set, and stores the mapping in the data storage system in association with a dataflow graph that provides data to or receives data from the datasets of the mapping.

In another general aspect, a system for mapping data stored in a data storage system includes: means for processing specifications of dataflow graphs that include nodes representing computations interconnected by links representing flows of data, with at least one of the dataflow graphs receiving a flow of data from at least one input dataset and at least one of the dataflow graphs providing a flow of data to at least one output dataset; means for identifying one or more sets of datasets, where each dataset in a given set matches one or more criteria for identifying different versions of a single dataset; means for providing a user interface to receive a mapping between at least two datasets in a given set; and means for storing the mapping received over the user interface in association with a dataflow graph that provides data to or receives data from the datasets of the mapping.

In another general aspect, a computer program for mapping data stored in a data storage system is stored on a computer-readable medium, and includes instructions for causing a computer to process specifications of dataflow graphs that include nodes representing computations interconnected by links representing flows of data, with at least one of the dataflow graphs receiving a flow of data from at least one input dataset and at least one of the dataflow graphs providing a flow of data to at least one output dataset; identify one or more sets of datasets, where each dataset in a given set matches one or more criteria for identifying different versions of a single dataset; provide a user interface to receive a mapping between at least two datasets in a given set; and store the mapping received over the user interface in association with a dataflow graph that provides data to or receives data from the datasets of the mapping.

Aspects can include one or more of the following features.

The set is presented over the user interface.

A list of possible mappings ordered according to a quantification of a match to the one or more criteria is presented over the user interface.

The list of possible mappings includes candidates that are more likely to be an instance of a given dataset ordered higher in the list.

One of the criteria is built into a mapper that identifies the one or more sets of datasets.

One of the criteria is received from the user interface.

At least one of the possible mappings indicates a component of a dataflow graph that represents a dataset, and at least one of the possible mappings indicates a component of a dataflow graph that does not represent a dataset.

A sub-graph of a dataflow graph including multiple components represents a dataset.

The sub-graph includes a data component.

The sub-graph includes an executable component.

Identifying one or more sets of datasets includes using heuristics for determining if a dataset in a given set has one or more characteristics in common with another dataset.

The characteristics include the quantity of bytes and records in a representation of the dataset.

The characteristics include the name of a representation of the dataset.

The characteristics include the date of creation of a representation of the dataset.

The characteristics include the data format of a representation of the dataset.

At least one of the datasets of the mapping belongs to a group of datasets known to a data management system.

A format mapping is provided between datasets in a given set.

The mapping includes an identifier that points to a record in the data management system that keeps track of the dataset.

The mapping is updated based on a change in a dataset.

Aspects of the invention can include one or more of the following advantages.

By identifying sets of datasets according to version identification criteria, a match between two instances of a dataset can be made more efficiently than purely manual operation. Further, by providing a user interface to receive a mapping between at least two datasets, the mapping will be more accurate than if the system was purely automatic.

Other features and advantages of the invention will become apparent from the following description, and from the claims.

DESCRIPTION

1 Overview

A data processing element may be in the form of a graph. A graph-based computation is implemented using a "dataflow graph" that is represented by a directed graph, with vertices in the graph representing components (either data storage components corresponding to stored data or computation components corresponding to executable processes), and the directed links or "edges" in the graph representing flows of data between components. A dataflow graph (also called simply a "graph") is a modular entity. Each graph can be made up of one or more other graphs, and a particular graph can be a component in a larger graph. A graphic development environment (GDE) provides a user interface for specifying executable graphs and defining parameters for the graph components.

Figure 1:
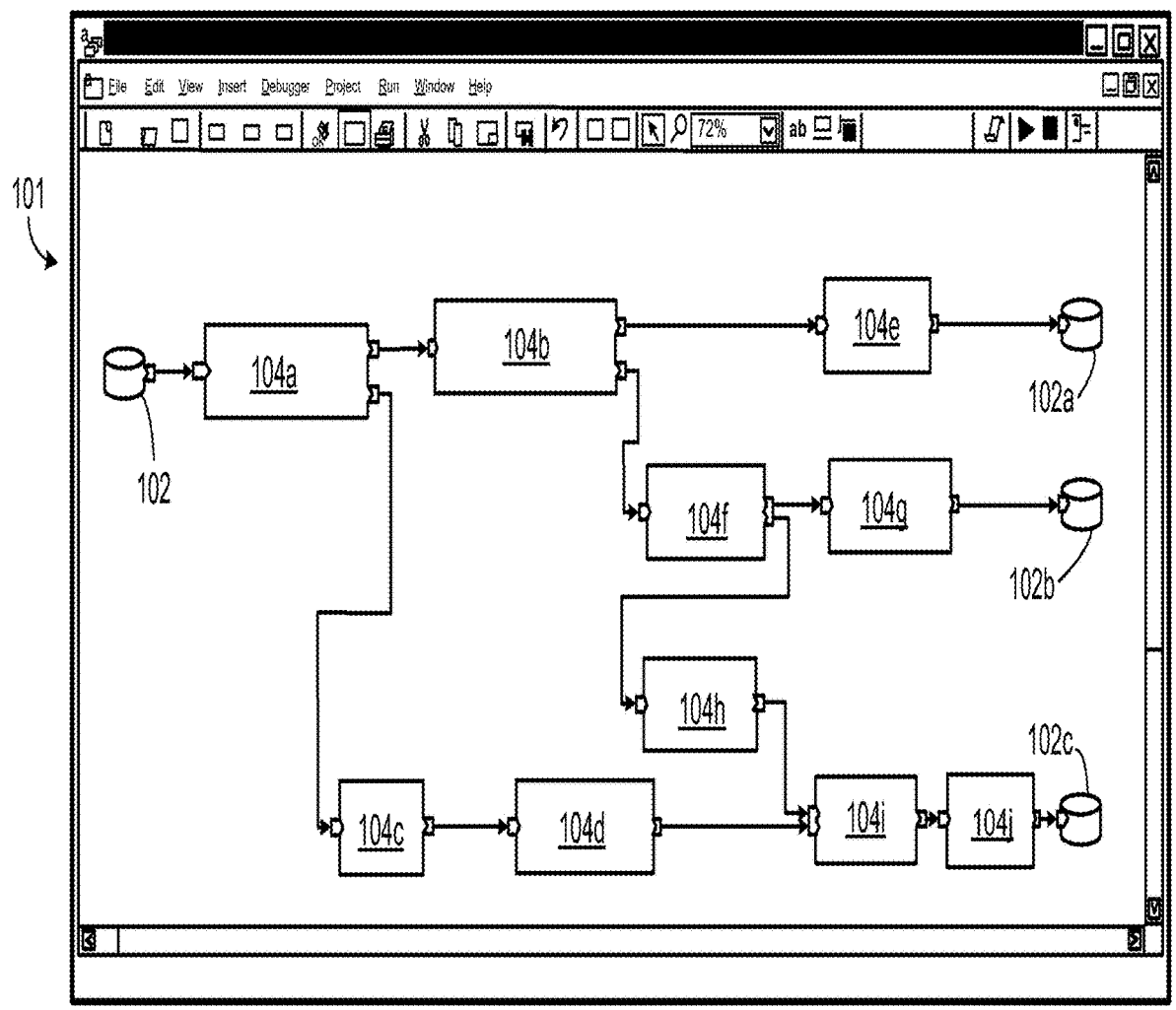
FIG. 1 is a dataflow graph.

Referring to FIG. 1, an example of a dataflow graph 101 includes an input component 102 providing a collection of data to be processed by the executable components 104*a*-104*j* of the dataflow graph 101. For example, the dataset 102 can include data records associated with a database system or transactions associated with a transaction processing system. Each executable component is associated with a portion of the computation defined by the overall dataflow graph 101. Work elements (e.g., individual data records from the data collection) enter one or more input ports of a component, and output work elements (which are in some cases the input work elements, or processed versions of the input work elements) typically leave one or more output ports of the component. In graph 101, output work elements from components 104*e*, 104*g*, and 104*j* are stored in output data components 102*a*-102*c*.

A dataset is an object (e.g., stored in an object oriented database) that represents a particular collection of data. In the context of a system of dataflow graphs, a component is capable of representing a dataset. In these cases, a graph may interact with the component representing a dataset (or simply "dataset component") in one or more ways. A dataset component includes instructions for accessing the physical data represented by a given dataset, so a graph can accept input from a dataset using a dataset component, provide output to a dataset using a dataset component, and process data of a dataset using a dataset component at an intermediate step. A dataset component can include various kinds information associated with a given dataset object including an instance of the dataset object. Such a system could have many dozens, hundreds, or thousands of graphs and associated dataset components. As the complexity of such a system increases, the relationships between different graphs and dataset components become more difficult to manage. More than one dataset component in the system can represent the same data source and each such dataset component can be associated with a different graph, graph subset, or executable component.

For example, in one possible scenario, a single dataset may be stored in more than one location associated with the data management system. In this scenario, two or more data sources contain similar or identical versions of the same data. Two graphs in the system might handle this single dataset, but each graph reads from and writes to a different data file, a different database table, or another type of dataset component.

In a similar scenario, the data (e.g., data files) represented by a given dataset may be not only stored in more than one location, but also interpreted using different data storage formats. As with the above example, two graphs may operate on two separate data files containing the same data, differing only in format. Each data file may have a different arrangement of data types, despite containing instances of the same data.

In an alternative scenario, one graph may operate on a data file containing an instance of the dataset, and another graph may operate on a database table also containing an instance of the dataset. In such a case, a data file and a database table will generally have two different data formats.

In another scenario, the data management system may access different versions of the same dataset each in different ways. One graph may access an instance of the dataset directly, such as by reading in a data file through a standard file input/output mechanism. Another graph may retrieve a file by querying an external source, such as a data repository available via a network. A graph may also access a database table retrieved through a similar external query, such as a query to a networked database.

The data management system may also make reference to different instances of the same dataset each in different ways. For example, a graph may be capable of accessing different data locations according to a parameter. Such a parameter could point to any number of data locations over time. A graph that operates multiple times may access different locations on different occasions if the parameter varies between executions of the graph.

In some scenarios, the representation of a dataset within a graph may not be a single component, but rather a collection of components, such as a "sub-graph" component within a graph that is itself implemented as a graph with multiple components. The collection may include one or more dataset components, and could also include one or more executable components.

All of these scenarios can potentially pose a problem for visualizing and analyzing the data handled by the data management system. If a user requires a consolidated view of the components that interact with a given dataset, various approaches can be used to reconcile the different instances of the dataset that may exist.

One approach is an automatic mechanism that identifies multiple instances of the same dataset and creates linkages between them. However, some automatic mechanisms have drawbacks, such as the following three drawbacks. First, the mechanism may require that each instance of a dataset be stored in particular manner, such as under a unified naming scheme and directory structure. This provides the mechanism with a way to identify and locate each one in the storage system associated with the data management system. However, this arrangement limits the flexibility of the data management system and may be too restrictive for some uses of the system.

Second, under several scenarios of operation, the mechanism may not properly identify instances of the same dataset and form the correct linkages. For example, this is likely if a dataset is accessed using an externally-referenced entity, and the automatic mechanism does not have access to that entity. Similarly, this is likely if a component accesses a dataset according to an independent parameter in a parameter list, and the mechanism does not have a way to access or interpret the parameter list. Further, this is likely if a dataset is represented by a complex entity made up of one or more dataset components and executable components, such as a sub-graph. An automatic mechanism may be unable to discern what particular combination of components represents a particular dataset.

Third, the mechanism may form redundant or unnecessary linkages between dataset instances. For example, some of the datasets handled by the data management system may represent extraneous data, such as the contents of error logs. Any linkages between instances of these datasets are unnecessary. Further, some of the instances of a dataset handled by the data management system may be redundant instances, such as cached data or other temporary copies of data. A linkage that connects to this type of data quickly becomes obsolete and would be confusing to a user examining the data management system.

An alternative approach is a system in which a user manually consolidates instances of the same dataset via a user interface. A user is less likely to miss essential linkages between instances of a dataset, and is also less likely to create redundant or unnecessary linkages between instances of a dataset. However, if the data management system has hundreds or thousands of components, the amount of time needed for the user to manually create the necessary linkages is prohibitively large.

In a partially-automated approach, a dataset mapper is used to provide some automatic analysis, and to enable some interaction with a user in a way that is not prohibitive for a user of a large and/or complex system.

Figure 2:
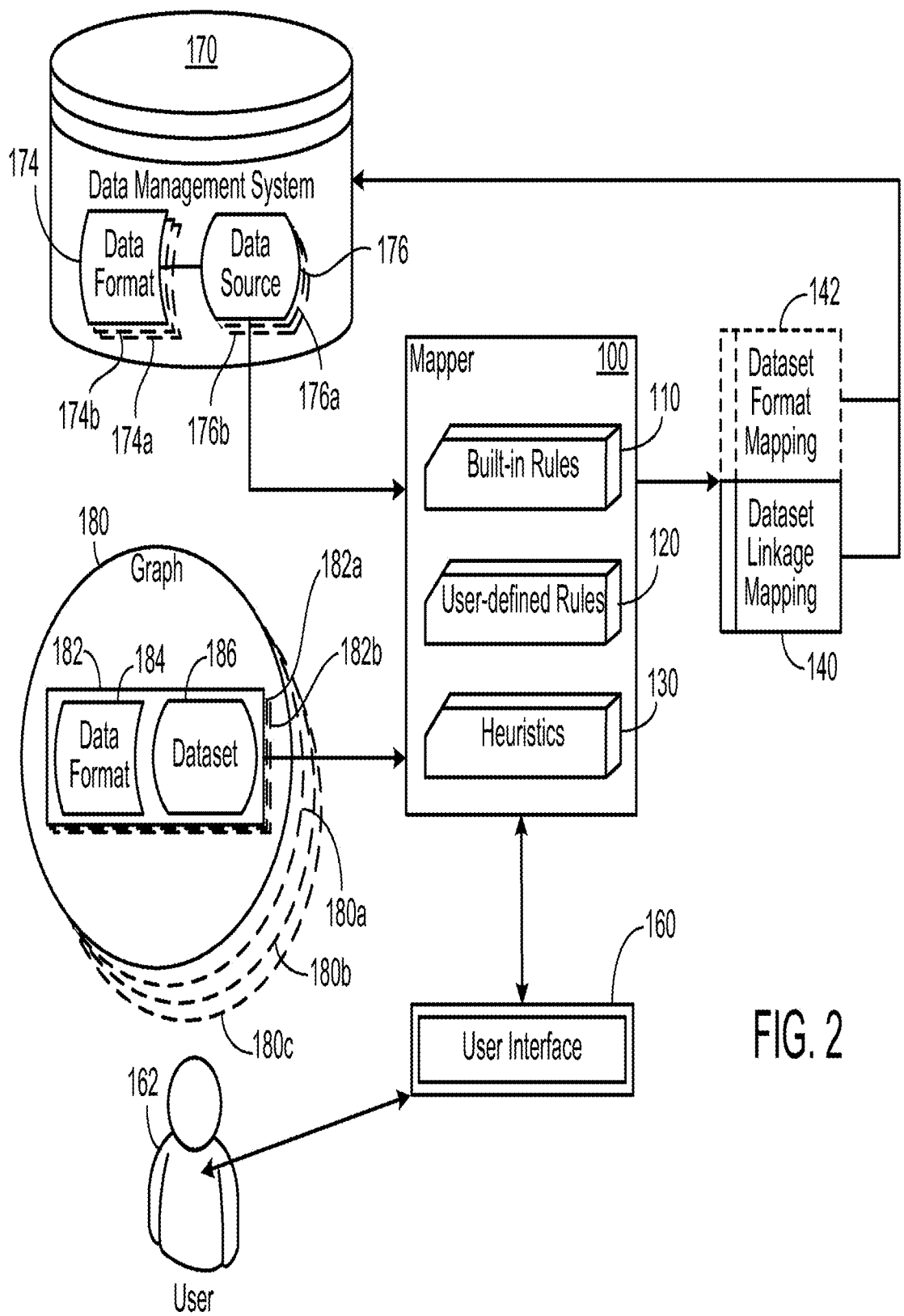
FIG. 2 is an overview of a dataset mapper and associated components.

FIG. 2 is a block diagram of one embodiment of an exemplary dataset mapper 100 showing the interrelationship between associated principal elements. A dataset mapper 100 is capable of analyzing a set of one or more graphs 180, 180a, 180b, 180c. Each graph is associated with one or more dataset components 182, 182a, 182b, where each dataset component could correspond to a data file, a database table, a sub-graph, or another kind of component representing a dataset. The mapper 100 analyzes the graphs for the purpose of forming linkages between dataset components that contain instances of the same dataset 186. The mapper 100 processes each dataset component according to a combination of built-in rules 110, user-defined rules 120, and heuristics 130, to determine if a dataset component 182 may contain an instance of one of several datasets representing data sources 176, 176a, 176b known to a data management system 170. The mapper 100 passes this information to a user interface 160, which allows a user 162 to select the proper dataset, if any, that corresponds to the dataset component 182. For example, the user interface 160 presents a list of possible candidate mappings based on a match to one or more criteria for identifying different versions or instances of a single dataset. Examples of such criteria, including criteria based on built-in rules, user-defined rules, and heuristics, are described in more detail below. The list can be ordered according to quantification of the match to the one or more criteria (e.g., candidates that are more likely to be an instance of a given dataset are ordered higher in the list). The mapper 100 then generates a dataset linkage mapping 140 that indicates that the dataset component 182 contains an instance of the dataset representing a data source 176.

Further, the dataset component 182 can have a data format 184 that differs from the format 174 of a corresponding linked data source 176. Depending on the requirements of the data management system 170, the user may choose to establish a single data format for all instances of the dataset. The system stores a format 174, 174a, 174b for each data source 176, 176a, 176b. Alternatively, the user can choose to create an optional mapping 142 between the format 184 of the dataset component 182 and the established format 174 of the corresponding data source 176. The optional data format mapping 142 allows the system 170 to retain information about the data types for each instance of the dataset.

The mapper 100 also enables a user to indicate a linkage between an executable component and a single dataset component, which may have no other linkages to it. For example, a dataset component may correspond to a source dataset with only one reader or a target dataset with only one writer. If the dataset object already exists in the system and has other relevant metadata, such as the correct record format, documentation, data profiles, etc., the linkage enables the dataset component to be mapped to the correct dataset.

2 Mapping Process

Figure 3A:
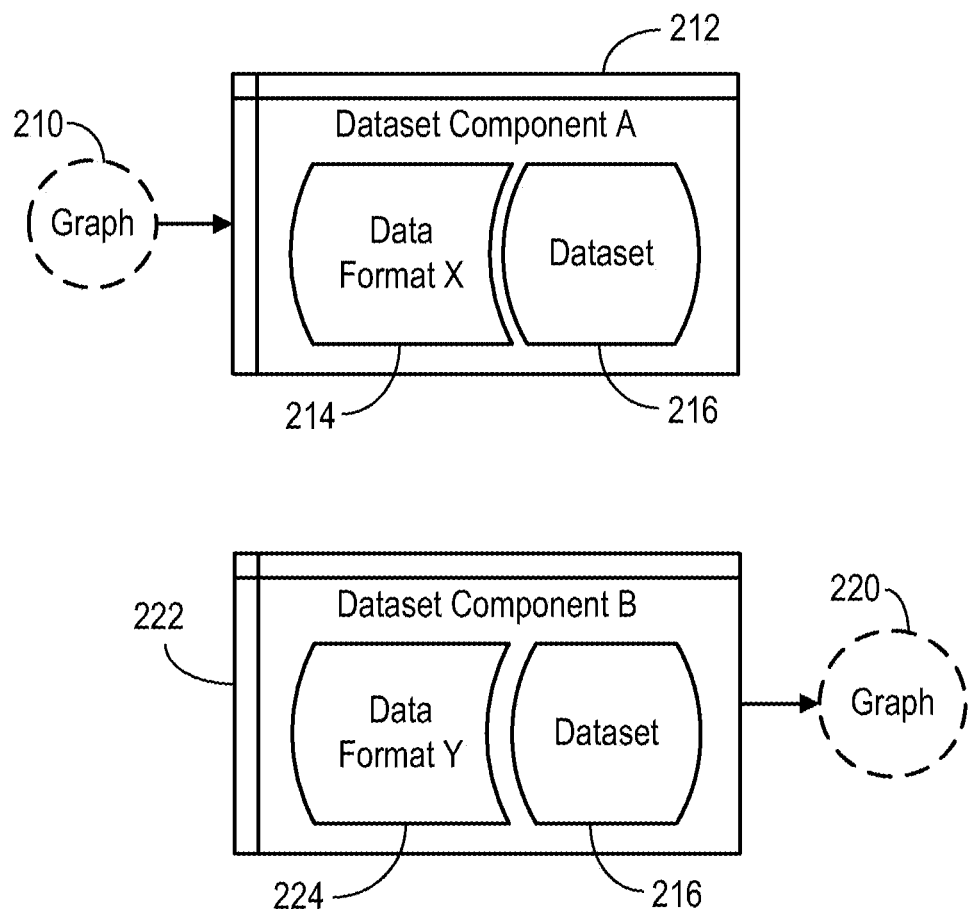
FIGS. 3A-3E are diagrams of different scenarios handled by a dataset mapper.

The mapper 100 is capable of handling common scenarios that arise in complex data management system. In a first scenario, shown in FIG. 3A, one graph 210 provides a dataset component 212 as output, and another graph 220 accepts a different dataset component 222 as input. Each dataset component contains an instance of the same dataset 216. This dataset may be the same as a dataset representing a data source 176 known to the data management system. Further, the first dataset component 212 has a data format 214 that may be the same as the format belonging to the second dataset component 222, or, alternatively, the second component may have a different format 224. The mapper 100 is capable of identifying the second dataset component 222 as being an instance of the dataset 216 represented by the first dataset component 212 and creating an appropriate linkage mapping 140.

Figure 3B:
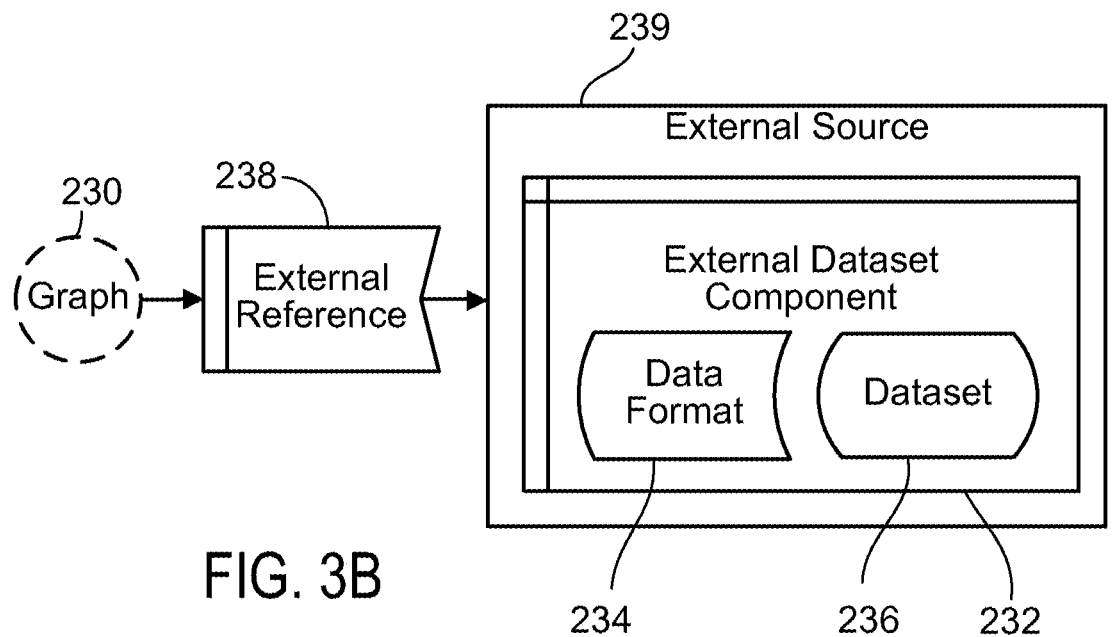

In a second scenario, shown in FIG. 3B, a graph 230 is associated with an external dataset component 232 using an external reference 238 to an external source 239. The external dataset component 232 has a data format 234 and is an instance of a dataset 236. As in the first scenario, the dataset 236 represented by the external dataset component may be a dataset representing a data source 176 known to the data management system 170. The mapper 100 is capable of identifying this external dataset component 232 as being an instance of another dataset and creating an appropriate linkage mapping 140.

Figure 3C:
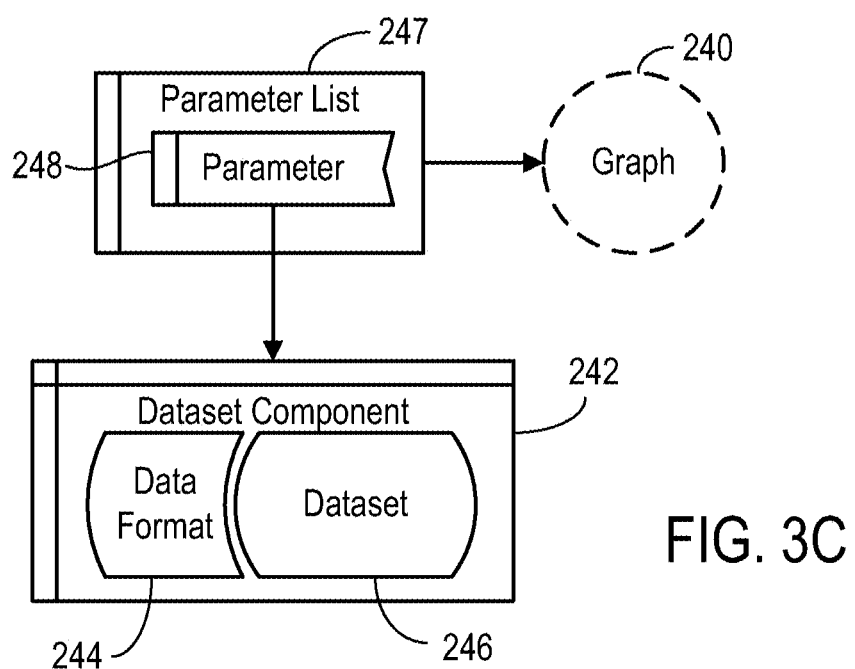

In a third scenario, shown in FIG. 3C, a graph 240 is associated with a dataset component 242 using a parameter 248 in a parameter list 247. The referenced dataset component 242 has a data format 244 and is an instance of a dataset 246. As in the first and second scenarios, the dataset 246 represented by the referenced dataset component may be a dataset representing a data source 176 known to the data management system 170. The mapper 100 is capable of identifying this referenced dataset component 242 as being an instance of another dataset and creating an appropriate linkage mapping 140.

Figure 3D:
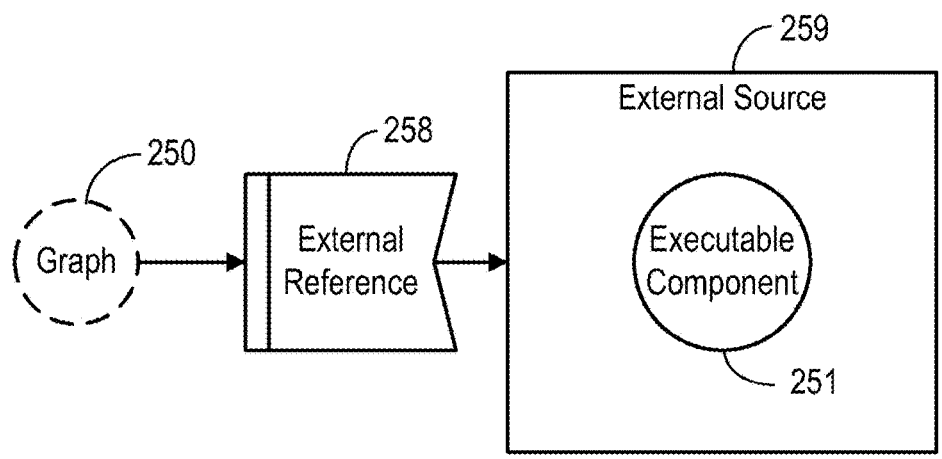

In a fourth scenario, shown in FIG. 3D, a graph 250 is associated with an external component 251 using an external reference 258 to an external source 259. The external component 251 is not a dataset component, but rather another kind of component, such as an executable component. The mapper 100 is capable of identifying this external component 251 as inapplicable to the dataset linkage mapping process.

Figure 3E:
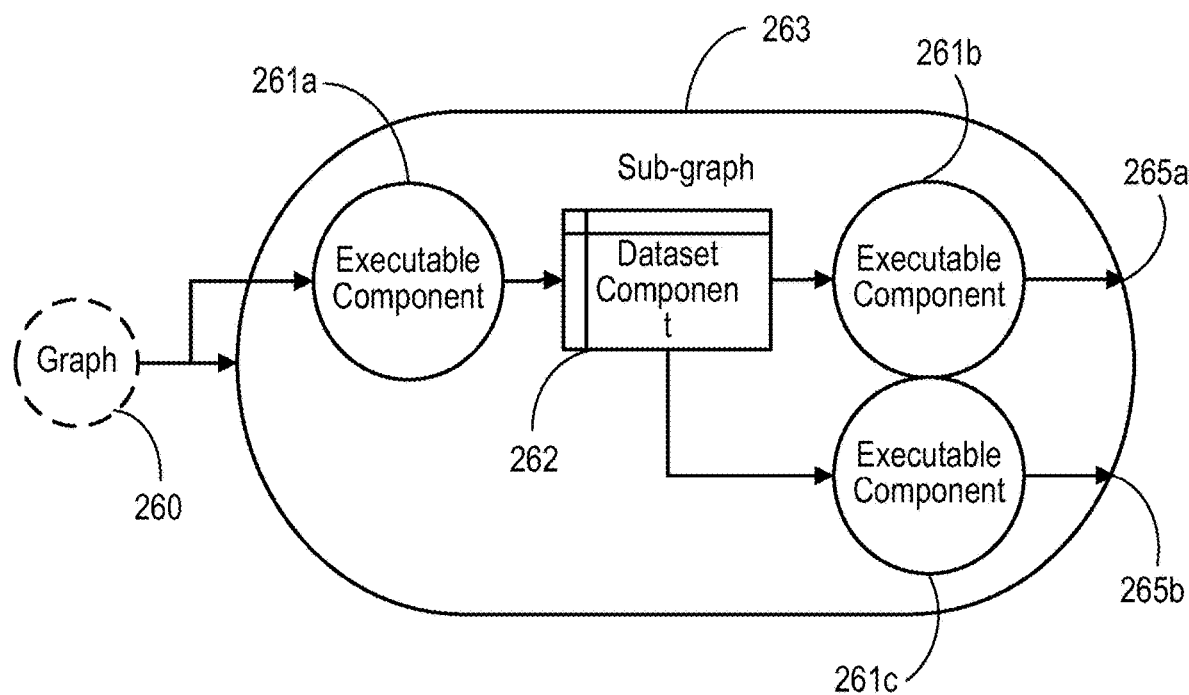

In a fifth scenario, shown in FIG. 3E, a graph 260 is associated with a sub-graph component 263, itself made up of several components. These components include at least one dataset component 262, and, in this example, one or more executable components 261a, 261b, 261c. Under this scenario, the sub-graph 263 as a single entity represents at least one dataset. Other exemplary sub-graphs may include multiple dataset components, and any number of executable components, including zero. Further, this sub-graph 263 has multiple outputs 265a, 265b. Each output is capable of providing a different instance of a dataset to the component that receives the output. Another exemplary sub-graph could also have any number of inputs. A further exemplary sub-graph may have no inputs or outputs that correspond to a respective dataset. For cases where the sub-graph does represent at least one dataset, the mapper 100 is capable of identifying the sub-graph 263 as being an instance of at least one dataset and creating at least one appropriate linkage mapping 140.

Figure 4:
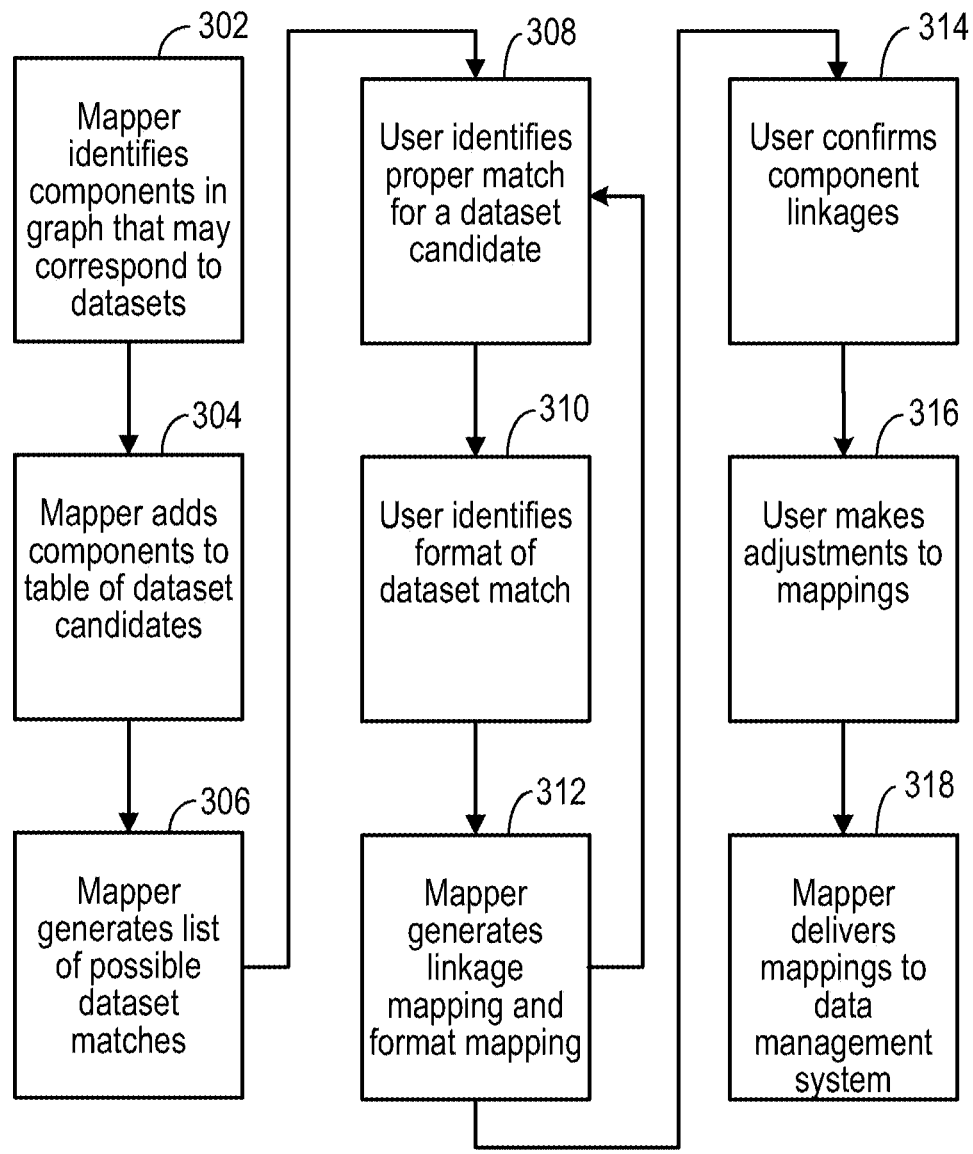
FIG. 4 is a flowchart of dataset mapper operation.

An example of a sequence of operation of the mapper is shown in FIG. 4. In step 302, the mapper first identifies, of the elements associated with a graph, which elements represent datasets. Generally, a graph will have one or more inputs and outputs, and each input and each output could be an instance of a dataset. Each graph may also handle an instance of a dataset at some intermediate step. As a result, each graph can be connected to multiple components that are capable of being dataset candidates. In some cases, the data management system has information about the characteristics of some of the components, including information about whether or not the component represents a dataset. In those cases, the mapper adds the potential dataset components to a table of dataset candidates in step 304. In some cases, a component could be a sub-graph made up of multiple components, including dataset components and executable components. A sub-graph could represent at least one instance of a dataset. Accordingly, the mapper compiles a list of all such sub-graphs and adds them to the table of dataset candidates as part of step 304. In other cases, the nature of the component may not be available to the data management system. The component could be accessed through a reference to an external entity, where the reference may be a query to a database table, a Uniform Resource Locator pointing to an Internet server, a parameter in a parameter list, or another type of reference. In these cases, the mapper generally has no means by which it can independently access the entity pointed to by the reference. Accordingly, the mapper compiles a list of all such references and adds them to the table of dataset candidates as part of step 304.

Next, in step 306, for a given dataset candidate, the mapper generates a list of known datasets that the dataset candidate could map to. The mapper uses a combination of user-defined rules, built-in rules, and heuristics to evaluate which known datasets could map to a dataset candidate.

Next, in step 308, the user then selects the known dataset that corresponds to the dataset candidate. The user may also access a full list of all known datasets, if none of the suggested known datasets is the correct match. In addition, the user can indicate that the dataset candidate is not a dataset. For example, a reference to a remote server could be a call to a remote executable procedure, which is not a data entity. As another example, the dataset candidate may represent data, but it may be data of a kind not pertinent to the data management system, such as an error log. In this case, the user may indicate to the user interface that this data is to be ignored in the mapping process.

Next, in step 310, the user identifies the data format of the newly-mapped dataset. The system may have a set of data format templates, one of which can be selected. Alternatively, the user can create a new data format in the user interface.

Next, in step 312 the mapper uses this information to generate a linkage mapping for the dataset candidate, and, optionally, a format mapping.

Next, the mapper offers the next dataset candidate to the user for linkage generation in another iteration of steps 308, 310, and 312, unless the mapper has processed all dataset candidates.

Next, in step 314, the user views the components associated with the data management system, to ensure that a visualization of the associations between graphs and dataset components is accurate based on the new linkages between components. In step 316, the user has the option of making any adjustments to the linkage and format mapping.

Finally, in step 318, the mapper delivers the linkage and format mapping to the data management system. The mappings can be stored alongside one or more graphs, or in a separate storage entity associated with the data management system, or by another means.

3 Dataset Mapping Maintenance

The mapper 100 is capable of handling multiple scenarios that may arise that affect the integrity of the dataset linkages.

The first scenario includes identifying new dataset candidates when new components are added to the data management system 170. Under this scenario, the mapper 100 analyzes each component and presents possible linkages to the user. The mapper 100 is capable of operating on any new components to generate the appropriate linkages as needed.

The second scenario includes maintaining the existing linkages as the data management system 170 changes over time. For example, new instances of a dataset may have come into existence over the course of the normal operation of the graphs associated with the system. As another example, a dataset may have changed its identity, such as its name or location in the system. As a further example, a dataset may have been deleted entirely. As another further example, a dataset candidate may have been overlooked in a previous round of linkage creation, and so the collection of linkages is incomplete. The user interface 160 of the mapping system allows a user 162 to modify the existing linkages to remedy any mappings that are incomplete or outdated.

The third scenario includes automatically updating linkages for dataset references that invariably follow a known pattern. For example, a graph may handle a dataset that is referenced in a parameter list 247. Such a parameter list may change over time. If the parameter list follows a standard format known to the data management system, the mapper can identify changes in the parameter list and update the existing linkages accordingly.

4 Dataset Linkage Mapping

Figure 5:
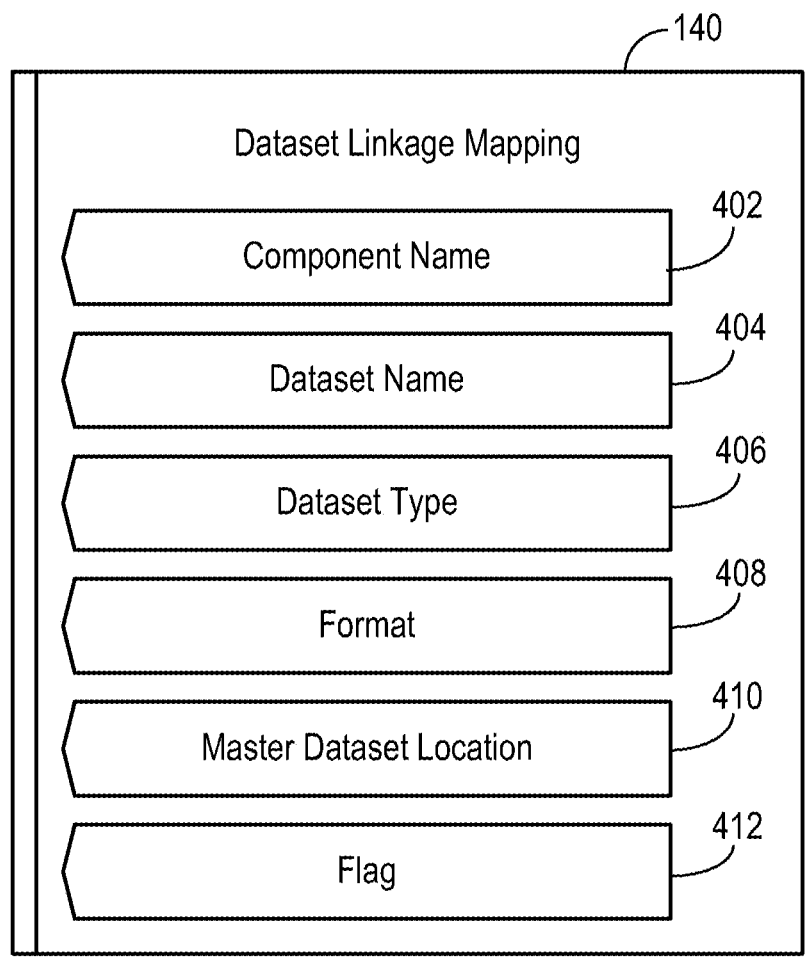
FIG. 5 is a dataset linkage mapping.

As shown in FIG. 5, a dataset linkage mapping 140 contains a component name 402, a dataset name 404, a dataset type 406, a format 408, a master dataset location 410, and a flag 412. The component name 402 is the dataset component or sub-graph that represents this instance of the dataset. The dataset name 404 is an identifier that points to the dataset represented by this component. The dataset type 406 indicates the category that this instance of the dataset falls under, for example, a data file, or a database table, or another type. The format 408 is the format or arrangement that this instance of the dataset uses to represent its data. The master dataset location 410 is an identifier that points to the record in the data management system that keeps track of this dataset. Finally, the flag 412 indicates whether or not this instance of the dataset should be ignored, for example, if the user has identified this instance of the dataset as not applicable to the data management system and should be excluded from the set of linkages.

5 Built-in Rules

The mapper 100 has a set of built-in rules 110 that operate according to standard conventions of the data management system. The mapper can identify datasets corresponding to a dataset component with the highest degree of accuracy if the dataset component follows the built-in rules 110. In one exemplary implementation of a rule, externally-referenced database tables containing dataset candidates must be placed in persistent storage under a standardized directory structure used by the data management system. Further, a graph that accesses an externally-referenced dataset component according to a parameter must use a parameter that the data management system is also capable of accessing and resolving. Further, the format of a dataset component must be available in persistent storage and accessible by the data management system. Other built-in rules are also possible, depending on the data management system.

6 User-Defined Rules

In addition to the built-in rules that the mapper uses to identify dataset candidates, the mapper 100 also has a collection of optional user-defined rules 120. These rules 120 may be enabled or disabled by a user, depending on which are applicable to the user's particular data management system. In one exemplary implementation, the mapper has six user-defined optional rules. The mapper can ignore some of the information in the name of a database table, if some of the information in the name obscures the identity of the table, such as information about the a user who defined the table. Further, the mapper can eliminate this information from the name of a database table. Further, the mapper can ignore a particular category of data files that are known to contain data that is not pertinent to the datasets associated with the data management system. Such a category could be a data file type or data file extension. Further, the mapper can resolve references to a particular parameter in a parameter list and replace the reference with the name of the parameter itself. Further, the mapper can eliminate references to a parameter entirely. The user can also create other rules for the mapper to follow.

7 Heuristics

In addition to following the built-in and user-defined rules to evaluate dataset candidates, the mapper 100 also uses a set of heuristics 130. The heuristics 130 allow the mapper to analyze the characteristics of a given dataset component and compare those characteristics to known datasets. A dataset component with similar characteristics to a known dataset is likely to be an instance of that dataset. In one exemplary implementation, the mapper uses two heuristics. One heuristic is the characteristics of the data of a given dataset component. For example, if the data associated with a dataset component has the same quantity of bytes and records as does the data associated with a known dataset, then that dataset component is likely to be an instance of that dataset. Further, if the dataset component has a name or date of creation similar to that of a known dataset, then the dataset component is likely to be an instance of that dataset. A second heuristic is the data format of a dataset component. If a dataset component shares a data format with a known dataset, then the dataset component is likely to be an instance of the dataset. This heuristic is less reliable in situations where multiple distinct datasets use the same data format.

8 Dataset Formats and Mapping

Each dataset representing a data source has an associated data format that indicates, for each element in the dataset, what type of data the element represents. For example, the data format of a database table indicates the data types of each field within a given record. The data management system 170 retains a single data format 174, 174a, 174b for each dataset representing a data source 176, 176a, 176b.

If the mapper 100 has encountered a dataset component 182 that represents a new dataset 186, then the mapper 100 creates a corresponding data format to be stored by the data management system, based on the data format 184 of the dataset component 182.

In some cases where a dataset component 182 represents a known dataset representing a data source 176, the dataset component 182 has a different data format 184 than the data format 174 of the known dataset representing a data source 176. The data management system 170 handles the dataset representing a data source 176 as a single entity, independent of the number of instances of that dataset that may exist. Consequently, the data management system 170 relies on the mapper 100 to consolidate the different formats 174, 184 when these situations arise. In one implementation, the mapper is capable of addressing each situation in one of four different ways depending on the requirements of the user and the data management system. The user 162 can choose any one of the four methods of consolidation for each situation.

Under the first method of consolidation, the mapper 100 uses the data format 184 of the dataset component 182 as the master data format of the dataset and updates the data management system 170 accordingly.

Under the second method of consolidation, the mapper 100 uses the data format 174 of the existing dataset as the master data format of the dataset and updates the data management system 170 accordingly.

Figure 6:
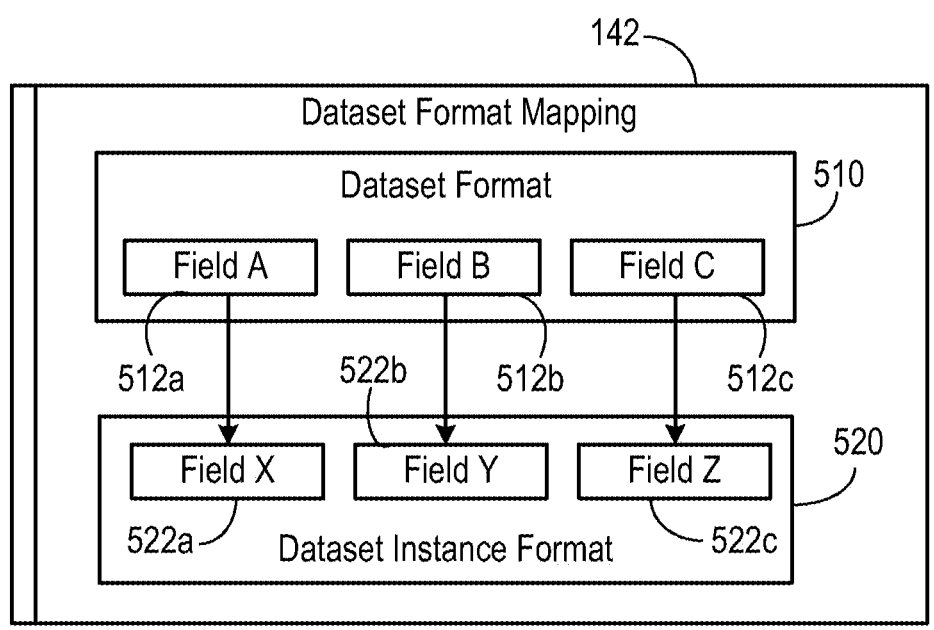
FIG. 6 is a dataset format mapping.

Under the third method of consolidation, the mapper 100 retains both data formats, and generates a mapping 142 between the fields of each data format. As shown in FIG. 6, the dataset format mapping 142 indicates which fields 512a, 512b, 512c of the dataset format 510 correspond to which fields 522a, 522b, 522c of the format of the dataset instance, e.g. the dataset component.

Under the fourth method of consolidation, the mapper generates a new union data format capable of acting as either data format.

9 General Computer Implementation

The dataset mapping approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method including:
   receiving a specification of a first data processing program that receives data from at least one input dataset and outputs data to at least one output dataset;
   receiving a specification of a second data processing program that receives data from at least one input dataset and outputs data to at least one output dataset;
   identifying a first dataset candidate represented by a first component of the first data processing program;
   identifying a second dataset candidate represented by a second component of the second data processing program;
   applying one or more rules to the first data processing program and the second data processing program to identify a correspondence between the first component and the second component;
   applying heuristics to the first dataset candidate and the second dataset candidate to identify one or more characteristics of data contained in the respective dataset candidates;
   determining, based on the correspondence and the one or more characteristics, a likelihood that the first dataset candidate and the second dataset candidate both represent the same dataset, and
   based on the determined likelihood, providing a user interface to receive an indication that the first dataset candidate and the second dataset candidate both represent the same dataset; and
   storing the indication received at the user interface in association with a data processing program that provides data to or receives data from the first dataset candidate or the second dataset candidate.

2. The method of claim 1, including presenting the first dataset candidate and the second dataset candidate over the user interface.

3. The method of claim 1, including presenting over the user interface a list of possible mappings between datasets, the mappings ordered according to a quantification of a match to the one or more rules or the heuristics.

4. The method of claim 3, wherein the list of possible mappings includes candidates that are more likely to be a version of a given dataset ordered higher in the list.

5. The method of claim 3, wherein at least one of the one or more rules or the heuristics is built into a mapper that identifies the first dataset candidate and the second dataset candidate.

6. The method of claim 3, wherein at least one of the one or more rules of the heuristics is received from the user interface.

7. The method of claim 3, wherein at least one of the possible mappings indicates a component of a dataflow graph that represents one of the dataset candidates, and at least one of the possible mappings indicates a component of a dataflow graph that does not represent one of the dataset candidates.

8. The method of claim 7, wherein a sub-graph of a dataflow graph including multiple components represents one of the dataset candidates.

9. The method of claim 8, wherein the sub-graph includes a data component.

10. The method of claim 8, wherein the sub-graph includes an executable component.

11. The method of claim 1, wherein the one or more characteristics include the quantity of bytes and records in a representation of one of the dataset candidates.

12. The method of claim 1, wherein the one or more characteristics include the name of a representation of one of the dataset candidates.

13. The method of claim 1, wherein the one or more characteristics include the date of creation of a representation of one of the dataset candidates.

14. The method of claim 1, wherein the one or more characteristics include the data format of a representation of one of the dataset candidates.

15. The method of claim 1, further including providing a format mapping between the first dataset candidate and the second dataset candidate.

16. The method of claim 1, further including storing an identifier that points to a record in a data management system that keeps track of the first dataset candidate and the second dataset candidate.

17. The method of claim 1, further including updating a stored mapping based on a change in at least one of the first dataset candidate or the second dataset candidate.

18. A system for mapping data stored in a data storage system, the system including
   a memory for storing instructions;
   a processor for executing the stored instructions;
   a data storage system storing a specification of a first data processing program that receives data from at least one input dataset and outputs data to at least one output dataset and storing a specification of a second data processing program that receives data from at least one input dataset and outputs data to at least one output dataset;

a mapper that identifies a first dataset candidate represented by a first component of the first data processing program, and identifies a second dataset candidate represented by a second component of the second data processing;

applies one or more rules to the first data processing program and the second data processing program to identify a correspondence between the first component and the second component;

applies heuristics to the first dataset candidate and the second dataset candidate to identify one or more characteristics of data contained in the respective dataset candidates; and determines, based on the correspondence and the one or more characteristics, a likelihood that the first dataset candidate and the second dataset candidate both represent the same dataset; and a user interface provided based on the determined likelihood that receives an indication that the first dataset candidate and the second dataset candidate both represent the same dataset, and stores the indication received at the user interface in association with a data processing program that provides data to or receives data from the first dataset candidate or the second dataset candidate.

19. The system of claim 18, wherein the user interface presents the first dataset candidate and the second dataset candidate.

20. The system of claim 18, wherein the user interface presents a list of possible mappings between datasets, the mappings ordered according to a quantification of a match to the one or more rules or the heuristics.

21. The system of claim 20, wherein the list of possible mappings includes candidates that are more likely to be a version of a given dataset ordered higher in the list.

22. The system of claim 20, wherein at least one of the one or more rules or the heuristics is built into the mapper.

23. The system of claim 20, wherein at least one of the one or more rules or the heuristics is received by the user interface.

24. The system of claim 20, wherein at least one of the possible mappings indicates a component of a dataflow graph that represents one of the dataset candidates, and at least one of the possible mappings indicates a component of a dataflow graph that does not represent one of the dataset candidates.

25. The system of claim 24, wherein a sub-graph of a dataflow graph including multiple components represents one of the dataset candidates.

26. The system of claim 25, wherein the sub-graph includes a data component.

27. The system of claim 25, wherein the sub-graph includes an executable component.

28. The system of claim 18, wherein the one or more characteristics include the quantity of bytes and records in a representation of one of the dataset candidates.

29. The system of claim 18, wherein the one or more characteristics include the name of a representation of one of the dataset candidates.

30. The system of claim 18, wherein the one or more characteristics include the date of creation of a representation of one of the dataset candidates.

31. The system of claim 18, wherein the one or more characteristics include the data format of a representation of one of the dataset candidates.

32. The system of claim 18, wherein the mapper generates a format mapping between the first dataset candidate and the second dataset candidate.

33. The system of claim 18, wherein at least one of the mappings includes an identifier that points to a record in a data management system that keeps track of the first dataset candidate and the second dataset candidate.

34. The system of claim 20, wherein the mapper updates at least one of the mappings based on a change in the first dataset candidate or the second dataset candidate or both.

35. A system including:

a data storage system including at least one data storage device, the data storage system storing a specification of a first data processing program that receives data from at least one input dataset and outputs data to at least one output dataset and storing a specification of a second data processing program that receives data from at least one input dataset and outputs data to at least one output dataset;

means for identifying a first dataset candidate represented by a first component of the first data processing program;

identifying a second dataset candidate represented by a second component of the second data processing program;

applying one or more rules to the first data processing program and the second data processing program to identify a correspondence between the first component and the second component;

applying heuristics to the first dataset candidate and the second dataset candidate to identify one or more characteristics of data contained in the respective dataset candidates; and determining, based on the correspondence and the one or more characteristics, a likelihood that the first dataset candidate and the second dataset candidate both represent the same dataset;

means for providing, based on the determined likelihood, a user interface to receive an indication that the first dataset candidate and the second dataset candidate both represent the same dataset; and means for storing the indication received at the user interface in association with a data processing program that provides data to or receives data from the first dataset candidate or the second dataset candidate.

36. A non-transitory computer-readable storage device storing a computer program for mapping data stored in a data storage system, the computer program including instructions for causing a computer to:

receive a specification of a first data processing program that receives data from at least one input dataset and outputs data to at least one output dataset;

receive a specification of a second data processing program that receives data from at least one input dataset and outputs data to at least one output dataset;

identify a first dataset candidate represented by a first component of the first data processing program;

identify a second dataset candidate represented by a second component of the second data processing program;

apply one or more rules to the first data processing program and the second data processing program to identify a correspondence between the first component and the second component;

apply heuristics to the first dataset candidate and the second dataset candidate to identify one or more characteristics of data contained in the respective dataset candidates;

determine, based on the correspondence and the one or more characteristics, a likelihood that the first dataset candidate and the second dataset candidate both represent the same dataset;

based on the determined likelihood, provide a user interface to receive an indication that the first dataset candidate and the second dataset candidate both represent the same dataset; and store the indication received at the user interface in association with a data processing program that provides data to or receives data from the first dataset candidate or the second dataset candidate.

37. The method of claim 1, wherein each version of the same dataset is associated with a different dataflow graph, dataflow graph subset, or executable component.

38. The method of claim 1, wherein each version of the same dataset is stored in a different location associated with a data storage system.

39. The method of claim 1, wherein each version of the same dataset is interpreted using a different data storage format.

40. The method of claim 1, wherein each version of the same dataset is accessed using a parameter that varies between executions of the data processing program.

41. The method of claim 1, wherein at least one of the data processing programs includes a dataflow graph that includes nodes representing computations interconnected by links representing flows of data, the dataflow graph receiving a flow of data from the at least one input dataset and providing a flow of data to the at least one output dataset.

42. The method of claim 1, wherein the first data processing program is a subgraph of a dataflow graph and the second data processing program is a sub-graph of the dataflow graph.

43. The system of claim 18, wherein each version of the same dataset is associated with a different dataflow graph, dataflow graph subset, or executable component.

44. The system of claim 18, wherein each version of the same dataset is stored in a different location associated with the data storage system.

45. The system of claim 18, wherein each version of the same dataset is interpreted using a different data storage format.

46. The system of claim 18, wherein each version of the same dataset is accessed using a parameter that varies between executions of the data processing program.

47. The system of claim 18, wherein at least one of the data processing programs includes a dataflow graph that includes nodes representing computations interconnected by links representing flows of data, the dataflow graph receiving a flow of data from the at least one input dataset and providing a flow of data to the at least one output dataset.

48. The system of claim 18, wherein the first data processing program is a subgraph of a dataflow graph and the second data processing program is a sub-graph of the dataflow graph.

49. The computer-readable storage device of claim 36, the computer program including instructions for causing a computer to present the first dataset candidate and the second dataset candidate over the user interface.

50. The computer-readable storage device of claim 36, the computer program including instructions for causing a computer to present over the user interface a list of possible mappings between datasets, the mappings ordered according to a quantification of a match to the one or more rules or the heuristics.

51. The computer-readable storage device of claim 50, wherein the list of possible mappings includes candidates that are more likely to be a version of a given dataset ordered higher in the list.

52. The computer-readable storage device of claim 50, wherein at least one of the one or more rules or the heuristics is built into a mapper that identifies the first dataset candidate and the second dataset candidate.

53. The computer-readable storage device of claim 50, wherein at least one of the one or more rules or the heuristics is received from the user interface.

54. The computer-readable storage device of claim 50, wherein at least one of the possible mappings indicates a component of a dataflow graph that represents one of the dataset candidates, and at least one of the possible mappings indicates a component of a dataflow graph that does not represent one of the dataset candidates.

55. The computer-readable storage device of claim 54, wherein a sub-graph of a dataflow graph including multiple components represents one of the dataset candidates.

56. The computer-readable storage device of claim 55, wherein the sub-graph includes a data component.

57. The computer-readable storage device of claim 55, wherein the sub-graph includes an executable component.

58. The computer-readable storage device of claim 36, wherein the one or more characteristics include the quantity of bytes and records in a representation of one of the dataset candidates.

59. The computer-readable storage device of claim 36, wherein the one or more characteristics include the name of a representation of one of the dataset candidates.

60. The computer-readable storage device of claim 36, wherein the one or more characteristics include the date of creation of a representation of one of the dataset candidates.

61. The computer-readable storage device of claim 36, wherein the one or more characteristics include the data format of a representation of one of the dataset candidates.

62. The computer-readable storage device of claim 36, the computer program including instructions for causing a computer to provide a format mapping between the first dataset candidate and the second dataset candidate.

63. The computer-readable storage device of claim 36, wherein at least one of the mappings includes an identifier that points to a record in a data management system that keeps track of the first dataset candidate and the second dataset candidate.

64. The computer-readable storage device of claim 50, the computer program including instructions for causing a computer to update at least one of the mappings based on a change in the first dataset candidate or the second dataset candidate or both.

65. The computer-readable storage device of claim 36, wherein each version of the same dataset is associated with a different dataflow graph, dataflow graph subset, or executable component.

66. The computer-readable storage device of claim 36, wherein each version of the same dataset is stored in a different location associated with the data storage system.

67. The computer-readable storage device of claim 36, wherein each version of the same dataset is interpreted using a different data storage format.

68. The computer-readable storage device of claim 36, wherein each version of the same dataset is accessed using a parameter that varies between executions of the data processing program.

69. The computer-readable storage device of claim 36, wherein at least one of the data processing programs includes a dataflow graph that includes nodes representing computations interconnected by links representing flows of data, the dataflow graph receiving a flow of data from the at least one input dataset and providing a flow of data to the at least one output dataset.

70. The computer-readable storage device of claim 36, wherein the first data processing program is a subgraph of a dataflow graph and the second data processing program is a subgraph of the dataflow graph.

* * * * *

UNITED STATES PATENT AND TRADEMARK OFFICE
CERTIFICATE OF CORRECTION

PATENT NO.         : 11,341,155 B2
APPLICATION NO.    : 16/902949
DATED              : May 24, 2022
INVENTOR(S)        : Tim Wakeling and Adam Weiss It is certified that error appears in the above-identified patent and that said Letters Patent is hereby corrected as shown below:

In the Claims

Column 11, Line 67, Claim 1, delete "dataset, and" and insert -- dataset; and --

Column 13, Line 10, Claim 18, delete "processing;" and insert -- processing program; --

Column 15, Line 36, Claim 42, delete "subgraph" and insert -- sub-graph --

Column 15, Line 58, Claim 48, delete "subgraph" and insert -- sub-graph --

Column 17, Line 13, Claim 70, delete "subgraph" and insert -- sub-graph --

Column 17, Line 15, Claim 70, delete "subgraph" and insert -- sub-graph --

Signed and Sealed this
Second Day of August, 2022

Katherine Kelly Vidal
*Director of the United States Patent and Trademark Office*